Patented June 5, 1934

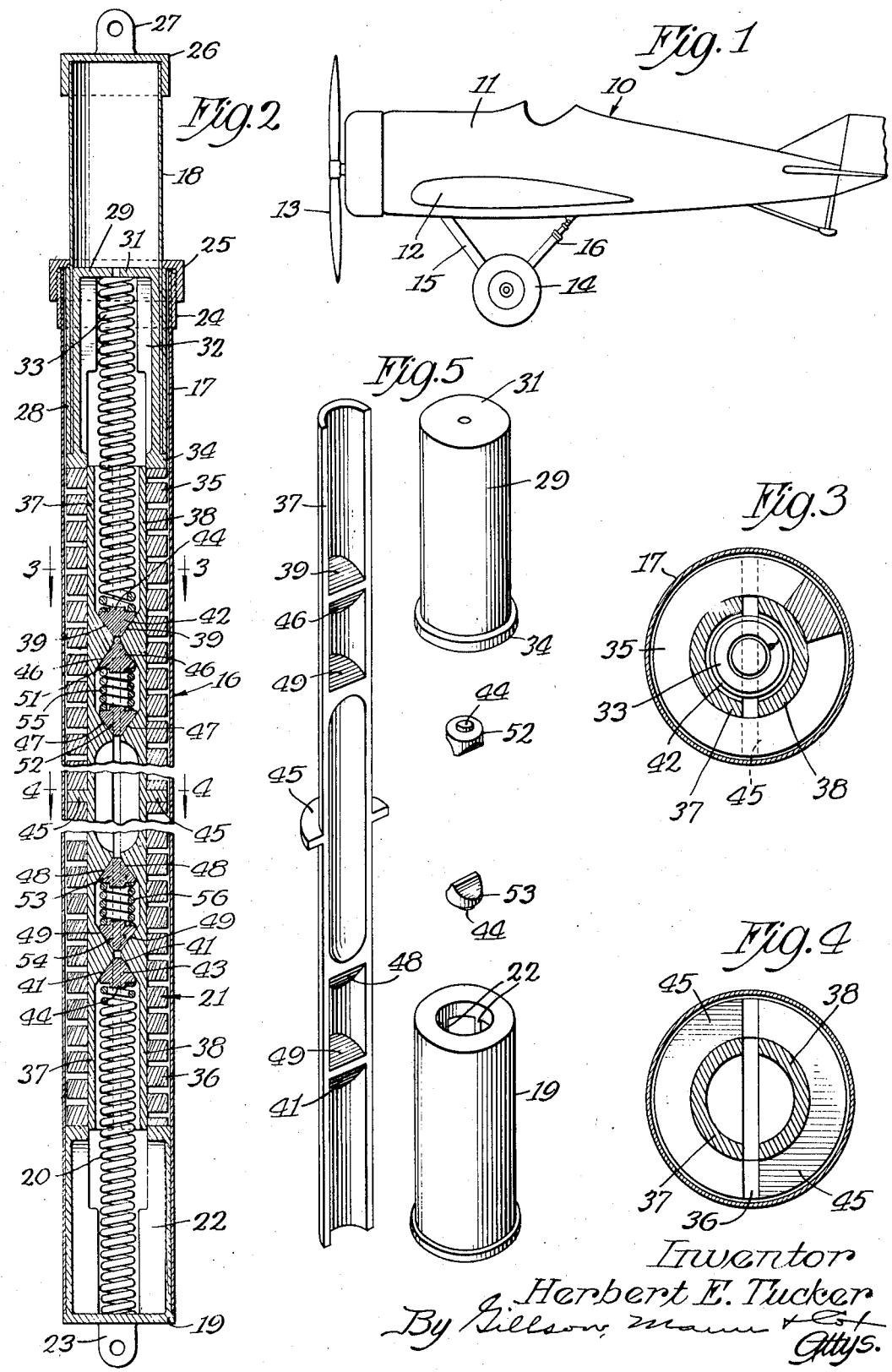

1,961,406

UNITED STATES PATENT OFFICE 1,961,406

SHOCK ABSORBER FOR AIRPLANES

Herbert E. Tucker, Chicago, Ill., assignor to Cardwell Westinghouse Company, a corporation of Delaware Application October 5, 1931, Serial No. 566,941

6 Claims. (Cl. 267—9)

This invention relates to shock absorbers and more particularly to shock absorbers adapted to be used on airplanes and the like.

One of the objects of the invention is the provision of new and improved shock absorbing mechanism that will properly yield during the landing of the plane and that will be capable of returning to normal position gradually and smoothly and without shock or violent rebound.

A further object of the invention is the provision of a new and improved shock absorbing device having means for resisting the relative movement of the parts in either direction with a constant friction and that has other means for causing an increasing frictional resistance as the device is compressed.

A still further object of the invention is the provision of a new and improved shock absorber mechanism that is adapted to be employed as a portion of a landing gear and that is so constructed that there is a resistance to both the compression and expansion of this mechanism and that after compression incident to the landing of the plane will automatically be restored to its normal position.

A further object of the invention is the provision of new and improved shock absorbing mechanism that is simple in construction, inexpensive to manufacture, efficient in operation and composed of few moving parts that may readily be assembled.

Other and further objects and advantages of the invention will appear from the following description taken in connection with the appended drawing, in which Fig. 1 is a side elevation of an airplane, shown more or less diagrammatically with the invention in position thereon;

Fig. 2 is a longitudinal sectional view of the shock absorber device;

Fig. 3 is a sectional view on the line 3—3 of Fig. 2;

Fig. 4 is a sectional view on the line 4—4 of Fig. 2;

Fig. 5 is a perspective view of a portion of the shock absorbing mechanism with parts omitted and with parts shown separated, in the interest of clearness.

Referring now to the drawing, the reference character 10 designates generally an airplane having the fuselage 11, wings 12, propeller 13 and the landing gear 14. The landing gear comprises the front brace or radius member 15 and the shock absorbing member 16 which, in the present invention, constitute the rear brace of the landing gear.

The shock absorbing member 16 comprises the telescopic tube including the tubular outer section 17 which contains the shock absorbing mechanism and the tubular inner section 18. Secured in what, for convenience, will be termed the outer end of the tubular section 17 is a stationary abutment member 19 against which the friction spring means 21 of the shock absorbing mechanism is adapted to abut. Abutment member 19 may be a casting provided with reinforcing ribs 22 which constitute guides for wedge spring member 20, as will presently appear. The outer end of the abutment member 19 is preferably provided with perforated lugs 23 which constitute means for attaching the shock absorbing member in position.

The opposite end of the tubular member 17 is provided with a sleeve 24 which extends about the same. The sleeve 24 is threaded at its outer end for receiving a cap 25. Cap 25 is provided with a central opening through which the section 18 is adapted to slide. Owing to the thinness of the tube 17 the sleeve 24 is employed for providing threads for the cap 25. The outer end of the section 18 is provided with a cap 26 which is rigidly connected thereto.

Further, the cap 26 is provided with parallel lugs 27 having apertures therethrough for attaching the inner end of the shock absorbing member in position.

The inner end of the section 18 has rigidly attached thereto an outer sleeve member 28 which is adapted to abut the cap 25 for limiting the outward movement of the section 18, as will presently appear.

An abutment member 29 is rigidly secured in the tubular section 18 and is open at its inner end and closed as at 31 at its outer end. This member is also provided with inwardly extending or reinforcing ribs 32 which also constitute guides or positioning ribs for the wedge spring 33. The inner end of the abutment member 29 is preferably provided with a collar 34 against which the tubular member 28 engages.

In the construction of landing gears for airplanes, it is desirable that the landing gear be so constructed that it will absorb the shocks incident to the landing of the plane with a maximum of resiliency and with the minimum of rebound. In the form of construction selected to illustrate one embodiment of the invention for accomplishing these functions, shock absorbing mechanism mounted within the tubular section 17 is employed for this purpose. This mechanism comprises the spring means 21 which in the form of construction shown includes two friction springs 35 and 36. Each of these springs has its turns rectangular in cross-section, as clearly shown in Fig. 2 of the drawing.

These springs fit within the tabular section 17, and are free to be compressed therein. A friction device is mounted within the spring means 21. This device comprises a plurality of friction shoes which are adapted to be forced outwardly into engagement with the interior of the spring means 21 by suitable wedge mechanism. In the form of construction shown, two shoes 37 and 38 are employed. These shoes are each provided adjacent their outer ends with cooperating wedge faces 39 and 41. Wedge members 42 and 43 are provided for engaging the wedge faces 39 and 41, respectively.

The springs 33 and 20 are adapted to engage the wedge members 42 and 43 for holding the same in wedging position and for resisting the outward movement of the wedge members. Each of the wedge members may, if desired, be provided with the positioning lugs 44, about which the inner ends of the springs 33 and 20 engage.

In the operation of the device, when the tubular section 18 is forced inwardly, the springs 33 and 20 will resist the inward movement, and, at the same time, force the wedge members 42 and 43 into wedge engagement with the wedge faces 39 and 41 with progressively increasing force as the shock absorber is compressed. These wedge members will force the shoes outwardly into frictional engagement with the interior surfaces of the friction springs 35 and 36, thereby resisting the compression of said springs.

The resiliency of the springs 35 and 36 will assist in resisting the compression of the shock absorber, and will also assist in the return of parts to normal position after compression.

Suitable means are provided for positioning the shoes within the tubular member 17; any suitable mechanism may be provided for this purpose. In the form of construction shown, the shoes are each provided with a radially extending flange 45, arranged intermediate between the ends thereof. The inner ends of the friction springs 35 and 36 engage the flanges 45 for positioning the shoes within the tubular section 17.

It is desirable that mechanism be provided for creating a constant frictional resistance within the shock absorber for resisting the movement of the parts in either direction. A plurality of wedge members under constant pressure are employed for this purpose. As shown, shoes 37 and 38 are provided with cooperating wedge faces 46, 47, 48 and 49, which are adapted to be engaged by corresponding wedge members 51, 52, 53 and 54. Wedge faces 46 and 47 are arranged opposite each other, and the wedges 51 and 52 which engage these faces are held in engagement therewith by spring 55 which is placed in position under compression. Likewise, the wedges 53 and 54 are held under constant pressure against the corresponding wedge faces 48 and 49 by a spring 56, which is placed in position under compression. Any suitable number of wedges for creating constant friction may be employed. For the purpose of illustrating the invention, only two sets are shown.

Preferably, though not necessarily, wedges 42 and 51 and the wedges 54 and 43 are arranged opposite each other, respectively. In the operation of the device, when the landing gear of the airplane strikes the ground, the impact will cause the section 18 to telescope the section 17 and this action will be resisted by the compression of the friction springs 35 and 36 and also by the springs 33 and 20. The compression of the springs 33 and 20 will force wedges 42 and 43 against the wedge faces of the shoes, thereby causing the latter to frictionally engage the inner surface of the friction spring for resisting the compression of the said last named springs. The springs 55 and 56 force the wedges 51, 52 and 53, 54, respectively, into engagement with the wedge surfaces of the shoes with a constant force.

Upon landing, the gear is not infrequently brought abruptly and violently into contact with the earth, and if no provision were made for absorbing the shock and preventing the rebound, the plane would be thrown with great force back into the air and thus thrown upwardly from the ground many times before settling down to the surface of the earth, much to the discomfort of the occupants of the plane. With the present construction, the impact of the ground will cause the absorber to be compressed and the frictional resistance will absorb considerable of the energy. The resistance of the constant resistance mechanism will prevent an abrupt rebound of the springs and will upon release absorb a considerable amount of the energy stored in the springs during their compression, thereby preventing violent rebound of the mechanism.

This will further permit the plane to alight with a cushioning effect and with the minimum amount of bouncing along the surface of the ground.

The tubular sections 17 and 18 may be, and preferably are, of thin, light material and, in addition to performing braces for the landing wheels, also serve the purpose of housing the shock absorbing mechanism. The telescoping of the tubular sections 17 and 18 are limited during compression by the engagement of the cap 26 with the cap 25 and their extension is limited by the engagement of the tubular member 28 with the cap 25.

While I have shown only two friction shoes and a certain number of wedge members, it is understood that the disclosure is by way of example only and that various changes and modifications may be made in the different parts of the device without departing from the spirit of the invention, as defined in the appended claims.

It will thus be seen that a shock absorber for airplanes has been provided which will yield and not rebound with violence enough to affect the upward movements of the plane as it hops along during the landing operation and at the same time the parts will be returned to normal position with sufficient rapidity to restore the resiliency of the device during the intervals between the striking of the ground by the plane while it is landing.

I claim as my invention—

1. A shock absorber comprising a resilient expansible and contractible tubular member, friction elements contained wholly within and engaging the interior of said member, wedge means for forcing said elements into frictional engagement with the interior of said tubular member with a constant force during the operation of said device under all conditions, means for forcing said elements into frictional contact with said tubular member with a gradually increasing force during the compression of said member, and a protecting member extending about said tubular member.

2. A shock absorber comprising a telescopic tubular member, resilient friction spring means within said member, friction shoes wholly within said spring means, means for positioning said shoes within said tubular member, a plurality of wedge elements within said friction spring means, resilient means engaging certain of said elements with a constant force under all operating conditions of said absorber, and resilient means for engaging other of said elements for exerting a variable pressure on the same during the compression of said tubular member.

3. In a shock absorber for airplanes, a telescopic tubular member comprising two tubular sections, a helical spring formed of stock material rectangular in cross-section within one of said sections, friction elements within said spring comprising a plurality of friction shoes having wedge faces, a plurality of sets of wedge elements for engaging said wedge faces, and means for forcing one set of said wedges against certain of said wedge faces with a constant pressure, and means for forcing the other set of said wedges against the remaining wedge faces with a gradually increasing force during the compression of said absorber.

4. In a shock absorber, a telescopic tubular member, resilient compression means within said tubular member for normally holding the same extended, a plurality of friction shoes within said means and coextensive therewith, means for forcing said shoes into frictional contact upon the compression of said telescopic member and additional means for applying a constant pressure to said shoes for forcing the same into frictional contact with said means during both the compression and extension of said telescopic member.

5. In a shock absorber, a telescopic member, friction means including a friction spring and friction shoes within said spring, wedge mechanism for forcing said shoes into frictional contact with said spring and for exerting a constant wedging action against said shoes by said mechanism under all operating conditions and resilient means within said member for returning the parts to normal position after release.

6. A shock absorber comprising tubular telescopic members, friction mechanism within said members, said mechanism comprising friction shoe means having wedge faces thereon, friction means surrounding said first-named means and frictionally engaging the same, a plurality of wedge elements within said friction means engaging said wedge faces for forcing said shoe means into frictional engagement with said second-named means, resilient means engaging certain of said elements with an increasing force during the compression of said absorber for increasing the frictional resistance to said compression and resilient means engaging certain other of said elements with a constant pressure thereon during both compression and release of said absorber.

HERBERT E. TUCKER.